United States Patent [19]

Heimbrand

[11] 4,257,302
[45] Mar. 24, 1981

[54] SAW TOOL

[75] Inventor: Eberhard Heimbrand, Horb, Fed. Rep. of Germany

[73] Assignee: Ledermann & Co., Horb, Fed. Rep. of Germany

[21] Appl. No.: 875,993

[22] Filed: Feb. 8, 1978

Related U.S. Application Data

[63] Continuation of Ser. No. 519,122, Oct. 30, 1974, abandoned.

[30] Foreign Application Priority Data

Oct. 31, 1973 [DE] Fed. Rep. of Germany ....... 2354481

[51] Int. Cl.³ ............................................. B27B 33/12
[52] U.S. Cl. ...................................... 83/839; 83/842; 144/218; 407/106
[58] Field of Search ................. 83/835, 838, 839, 840, 83/842, 843, 844, 698; 144/230, 218, 229, 231; 407/106

[56] References Cited

U.S. PATENT DOCUMENTS

| 207,003 | 8/1878 | Berry | 83/844 |
|---|---|---|---|
| 306,967 | 10/1884 | Simonds | 83/840 |
| 330,680 | 11/1885 | Dean | 83/843 |
| 1,169,594 | 1/1916 | Amborn | 407/106 |
| 1,239,459 | 9/1917 | Carew | 407/106 |
| 1,340,128 | 5/1920 | Westgard | 83/842 |
| 1,642,185 | 9/1927 | Westgard | 83/836 |

FOREIGN PATENT DOCUMENTS

| 1032744 | 4/1976 | Canada | 407/106 |
|---|---|---|---|
| 833117 | 1/1952 | Fed. Rep. of Germany | 83/841 |
| 2647546 | 4/1978 | Fed. Rep. of Germany | 407/106 |

*Primary Examiner*—W. Donald Bray
*Attorney, Agent, or Firm*—Becker & Becker Inc.

[57] ABSTRACT

A saw tool, especially a circular saw blade, an endless saw blade, a mill saw blade or the like, with a blade-shaped tool body having detachably connected thereto at least one cutting member with a clamping element between two tensioning surfaces of the tool body. The saw tool is characterized primarily in that for purposes of obtaining the full tensioning and engaging effect of the cutting member and clamping element during a change in position of the clamping and engaging surfaces caused by the clamping deformation, the clamping element includes floating bearing means. The clamping element is an eccentric peripherally having a smaller radius of curvature than corresponding inner surfacing of a recess of an intermediate piece therewith. The intermediate piece for pivotal support at the eccentric is located with play in the recess of the tool body.

6 Claims, 29 Drawing Figures

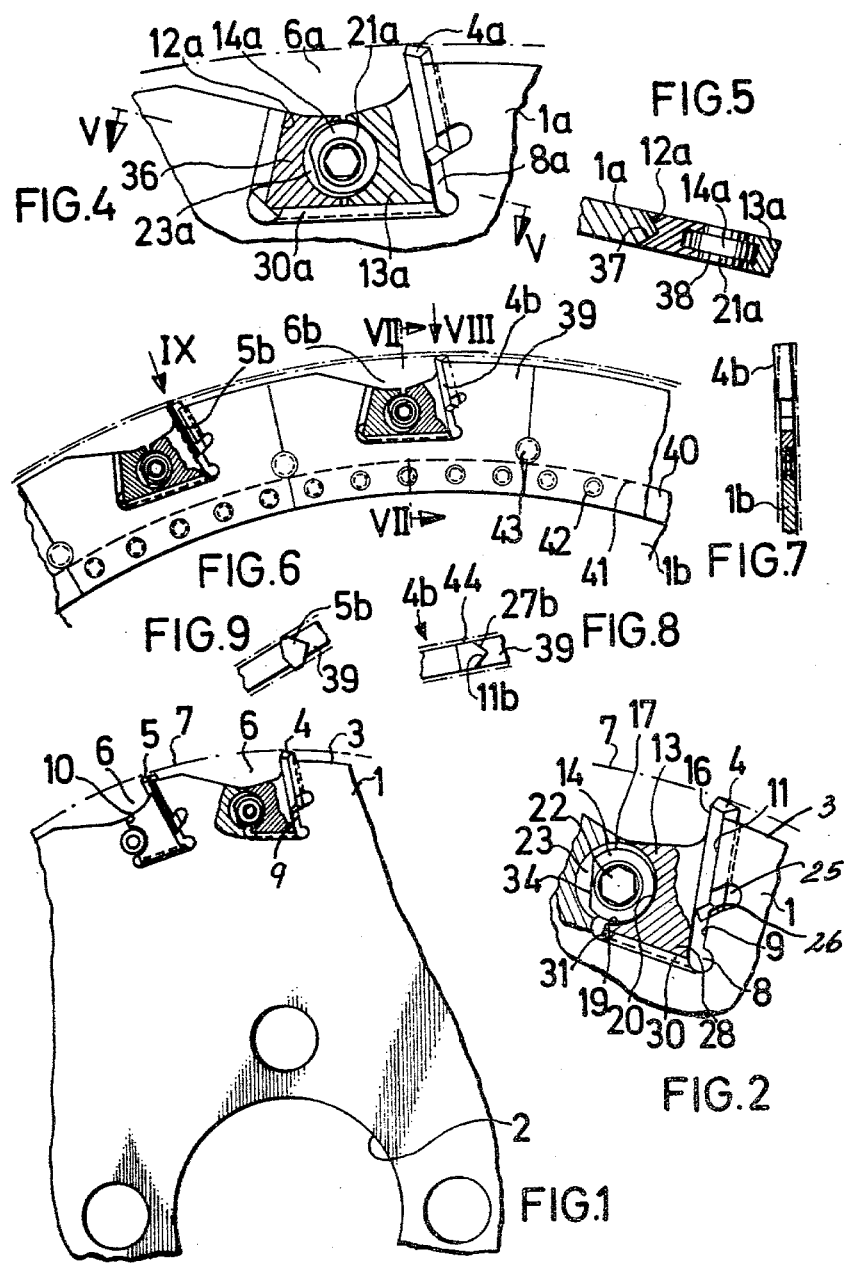

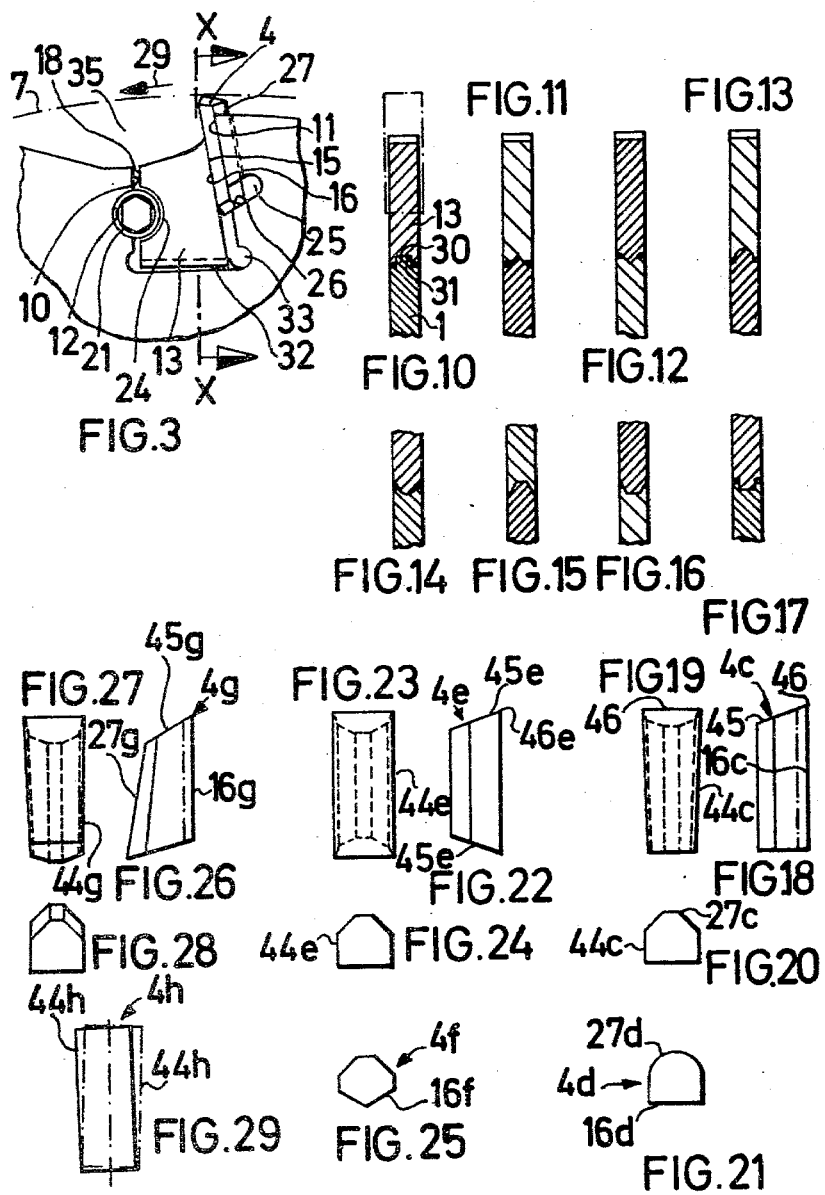

SAW TOOL

This is a continuation application of Ser. No. 519,122, filed Oct. 30, 1974 (now abandoned) being based on German patent application Ser. No. P 23 54 481.2 filed Oct. 31, 1973 as claimed for priority under 35 USC 119.

The invention relates to sawing tools in particular circular saw-blades, band saw-blades, frame saw-blades or the like having a blade-like tool body on which at least one cutting member is removably fixed by means of a clamping element disposed between two clamping faces of the tool body.

In the mounting of such cutting members the clamping faces of the tool body are forced apart by the clamping pressure by way of deformation of the tool body so that the predetermined relative positions of such faces no longer exist, with the result that the secure contacting of the clamping faces is no longer ensured. Thus, the holding of the cutting members is adversely affected, such that these change their position or, in extreme cases, become loose.

The invention is based on the problem of designing a sawing tool of the above-mentioned type wherein the clamping deformation of the tool body is compensated for in a simple manner and thus a secure holding of the cutting member is ensured.

According to the invention the clamping element is mounted in floating manner opposite a clamping face to take account of the variation of position due to the clamping deformation of the tool body, so that the clamping element and the cutting member may be aligned with respect to the clamping face with constant secure support irrespective of the other clamping face corresponding to the deformation of the tool body by the clamping pressure. As cutting members there may be provided cutting blades, cutting knives, turnover cutting plates or the like. The tool is preferred for the machining of steel, but is also suitable for non-ferrous metal machining, woodworking and plastic processing or the like.

A particularly simple design results when the cutting member is mounted floating in respect of a clamping face by a float bearing which has at least one pivot lying approximately at right angles to the plane of the tool body, whereby if only a single pivot is provided an accurately determined change of position of the cutting member is ensured.

The design of the invention is suitable, in particular, for those sawing tools in which clamping faces are formed preferably by the edges of a recess lying crosswise to the plane of the tool body and extending to both surfaces of such body and thus to those tools having cut-outs opening to the edge and intended to receive a clamping element and cutting member, since such tools are prone to clamping deformations. A simple design and a simple mounting are ensured if the clamping faces lie opposite and preferably converging in a direction toward the cutting edge of the tool body.

It is feasible, that the bearing faces of the float bearing lie on one another substantially with linear contact. Thereby comparatively high specific surface pressures result but as for a cutting bearing ensuring an extremely satisfactory mobility.

In a simple embodiment, the float bearing has two cooperating cylindrical bearing faces centred on a common pivot the convex bearing face preferably having a smaller radius of curvature than the concave bearing surface so that the linear contact described results.

For simplification of the mounting, the float bearing forms a constructional part with the clamping element whereby also a compact construction may be achieved.

A particular advantageous development of the subject matter of the invention consists in that the clamping element has a clamping eccentric the cam face of such eccentric preferably forming a bearing face of the floating bearing so that a separate floating bearing is not necessary and thus a facilitated mounting and, in addition, a very compact construction results. In particular, in this case the linear contacting of the bearing faces is also suitable as it facilitates the clamping rotation of the clamping eccentric.

The clamp eccentric may be accommodated in a very space saving manner if it is formed as a peripheral eccentric or cam, the middle axis of which lies preferably at right angles to the plane of the tool body so that even with a narrow cutwidth of the sawing tool, a comparatively large and stable design of the clamping eccentric is possible.

For the secure supporting of the clamping eccentric against the clamping pressure, the clamping eccentric is supported against the clamping pressure by a cylindrical bearing or journal means. This bearing or journaling means projects preferably on both sides and engages in a bearing recess corresponding to its diameter.

The preferably disc-like clamping eccentric with comparatively small diameter of the bearing journal means may project beyond the periphery of such bearing or journal means accordingly in an advantageous manner having a larger diameter.

In the further design of the invention the clamp eccentric is of lesser thickness than the tool body whereby it engages preferably with its side turned away from the peripheral zone forming the clamping zone in a recess larger compared with this so that in a simple manner an axial securing of the loosely inserted clamping eccentric and an arrangement projected against soiling are ensured.

If the bearing recess is shell-shaped, then the clamping eccentric may be formed integrally with the bearing journal as the clamping eccentric may be inserted crosswise to its axis of rotation of the bearing recess.

In order that the cutting member which consists, for example, of hard metal may be designed very simply and does not have to be adapted to the clamping eccentric, the clamping eccentric is supported on the cutting member via an intermediate piece having preferably the concave bearing surface formed therein.

The clamping eccentric may also be supported via a separate counter-bearing piece on the tool which has preferably the bearing recess and/or the groove and lies on the side of the clamping eccentric which is turned away from the cutting member or from its clamping zone belonging to the cutting member. It is however also feasible for the clamping eccentric to be supported directly on the tool body which then has in the appropriate edge of the recess the bearing recess and/or the groove.

In order that the clamping eccentric may be simply actuated, it has a key member, preferably a multi-edged recess such as a hexagonal recess, coaxial therewith.

For the further improvement of the holding and the alignment of the cutting member, at least one clamping face is profiled in cross-section, in particular symmetrically to the middle plane of the tool body or of the cutting member whereby the appropriate counterface has a corresponding counter profile.

The bottom face of the recess may also be profiled in cross-section, preferably symmetrically to the middle plane of the tool body, the counterface provided on the intermediate and/or on the counter-bearing piece having a corresponding counter profile so that movements of the cutting member and of the clamping element crosswise to the plane of the tool body are practically excluded.

The profiles may in a simple manner engage groove-like and spring-like in one another whereby they are preferably formed rectangular, trapezoidal, triangular or semi-circularly.

In particular, with profiled design of the clamping faces and when the clamping faces approach one another towards the cutting zone, it is of particular advantage if the clamping eccentric has a non-curved section set back in respect of its cam face which section preferably connects that part of the cam face furthest from the axis with that part of such surface closest thereto, such that when this section is brought into the region of the counter face associated with the clamping eccentric a particularly close drawing together of the clamp element is possible and the clamp element, even with profiles engaging in one another groove-like and spring-like, can be removed cross-wise to the plane of the tool body or in the direction of its cutting zone from the tool body.

The cutting member is designed suitably as a turn-over cutting member preferably rod-like so that a very rapid repair of the sawing tool after becoming blunt is ensured.

The invention will now be described further, by way of example only, with reference to the accompanying drawings illustrating several embodiments, with the parts essential for the invention drawn almost true to scale. In the drawings:

FIG. 1 shows in elevation a section of a sawing tool according to the invention;

FIG. 2 shows a part of FIG. 1 drawn to a larger scale;

FIG. 3 is a front elevation of the arrangement shown in FIG. 2;

FIG. 4 is a view corresponding to FIG. 2 of a further embodiment of the invention;

FIG. 5 is a section on line V—V of FIG. 4;

FIG. 6 shows a further embodiment in a view corresponding to FIG. 1;

FIG. 7 is a section on line VII—VII of FIG. 6, but with the clamping element removed;

FIG. 8 is a scrap view in the direction of the arrow VIII of FIG. 6;

FIG. 9 is a scrap view in the direction of the arrow IX of FIG. 6;

FIG. 10 is a section on line X—X of FIG. 3;

FIGS. 11 to 17 are views corresponding to FIG. 10 of further embodiments;

FIG. 18 shows a cutting member in side elevation;

FIG. 19 shows the cutting member of FIG. 18 in front elevation;

FIG. 20 shows the cutting member of FIG. 19 in plan view;

FIG. 21 shows a still further embodiment in a like manner to FIG. 20;

FIGS. 22 to 24 are views corresponding to FIGS. 18 to 20 respectively and show a still further embodiment;

FIG. 25 is a view corresponding to FIG. 24 and shows yet another embodiment;

FIGS. 26 and 28 are views corresponding to FIGS. 18 to 20 respectively and show yet another embodiment; and FIG. 29 is a front elevation of a still further embodiment.

As FIGS. 1 to 3 show, a sawing tool shown as a circular saw-blade in the embodiment illustrated, has an annular sheet-like tool body or tool support 1 having plain parallel side faces, the inner opening 2 being adapted for attachment coaxially of the working spindle of a rotational tool. On its outer periphery 3, the tool body 1 is provided with similar or dissimilar cutting members 4,5 which are removably secured in position by clamping elements 6 and which extend beyond the outer periphery of the tool body to a cutting zone 7 formed by an annulus outside the outer edge 3 of the tool body 1.

For each cutting member 4,5 the tool body 1 has a respective recess in its peripheral edge 3, the recesses having two opposite lateral faces 9,10 which converge towards the cutting zone 7, the lateral faces 9,10, in axial view, lying obliquely to respective axial planes of the tool body 1 but being inclined at different angles with regard thereto. In the area of the lateral faces 9,10 there are provided respective clamping faces 11 and 12, such faces serving as reaction faces in respect of the clamping pressure applied to clamp the cutting members 4 and 5 respectively.

The clamping element 6 has an intermediate piece 13 and a clamping eccentric 14 which, in the embodiment according to FIGS. 1 to 3, form the only parts of the clamping element. The intermediate piece 13 is disposed within the recess 8 and is supported directly on the cutting member 4 or 5 and, in particular bears on the breast face 16 of such member via a pressure edge 15 at that face thereof opposite to the clamping face 11 which the cutting members 4 and 5 respectively contact. The intermediate piece 13 is supported relative to the other clamping face 12 by contact with the periphery 17 of the clamping eccentric 14, a self-locking face of such periphery 17 lying eccentrically to the middle axis and axis of rotation of the clamping eccentric 14. The side edge 18 of the intermediate piece 13 has, approximately centrally thereof a substantially semi-circular groove 19 therein, which is of a lesser dimension in the thickness direction of the intermediate piece 13 than such thickness, such as to be bounded at each side by the intermediate piece 13, the thickness of the intermediate piece being approximately equal to the thickness of the tool body 1 so that its lateral faces lie flush with the corresponding lateral faces of the tool body 1. The groove 19 has a radius of curvature slightly in excess of the maximum radius of curvature of the periphery 17 of the eccentric. Thus the disc-like clamping eccentric 14 is axially located by contact between its lateral faces and the lateral faces of the groove 19 and is supported at a bearing point 20 on a line parallel to its axis, and approximately at the deepest part of the groove opening 19 relative to the intermediate piece 13.

In this area of linear contact there is provided, therefore, the bearing line 20 around which the intermediate piece 13, including the cutting member 4 or 5 in contact therewith, can pivot or rock relative to the clamping eccentric 14 or to the other clamping face 12.

The clamping face 12 is in the form of an arcuate indentation complementing the geometry of at least a portion of the periphery of the eccentric 14.

As is seen in FIG. 3, there is a space 13a between the intermediate member 13 and the bottom of recess 8 so as to permit the intermediate member to rock about bearing line 20. Also, due to the eccentricity of the clamping member 14 and the configuration of the groove in the intermediate piece 13, the bearing line 20 moves dependent upon the rotational disposition of the eccentric relative to the intermediate piece, that is, the bearing line 20 floats.

The clamping eccentric 14 has a coaxial bearing journal 21 projecting from each face thereof, the journals being of a substantially lesser diameter than the clamping eccentric as a whole and being defined by projections of cylindrical external configuration formed integrally with the clamping eccentric 14, the outer extremities of the journals being substantially coplanar with the lateral faces of the intermediate piece 13 and of the tool body 1. The bearing journals 21 are of sleeve-like form and have an hexagonal through bore thereto which form a key member for the insertion of a key by which the clamping eccentric 14 can be turned. The clamping face 12 has a semi-circular bearing recess to receive the projections integral with the clamping eccentric 14 including the coaxial sleeve-like bearing journals 21, such recess being arranged substantially centrally of the appropriate edge 10 of the recess 8. In the lateral face 10 of the recess 8 there is further provided a shell-like recess 23 which is formed in a like manner to the groove 19, recess 23 being substantially coaxial with and of a like diameter to such groove 19. Recess 23 receives the appropriate peripheral section of the clamping eccentric 14, the latter being axially secured thereon, whereby the opposed edges 10, 18 of the tool body 1 and of the intermediate piece 13 being in spaced apart disposition. The end surfaces of lateral walls of the recess 23 constitute the clamping faces 12. The side walls of the groove 19 of the intermediate piece 13 are each formed with a semi-circular recess 34 arranged approximately coaxially with the bearing journal 21 but of a radius slightly in excess of that of such journal so that the bearing journal 21 does not contact the curved faces of such recesses.

The clamping face 11 for receiving the cutting members 4 and 5 respectively extends only beyond an outer part section of the appropriate lateral edge 9 of the recess 8, there being a cut-out 25 in the lateral edge 9 at the inner end of the clamping face 11, the innerlateral limit 26 of the cut-out defining a shoulder to receive the lower end of the cutting members 4 and 5 respectively, so that the distance of such members from the axis of the tool or in relation to the cutting zone 7 is accurately fixed. In cross-section, the clamping face 11 is for example, of groove-like form, the rear face 27 of the cutting member 4 and 5 respectively having a corresponding profile so as to be secured against movements cross wise to the plane of the tool body 1. The pressure edge 15 of the intermediate piece 13, together with the breast face 16 of the cutting member 4 and 5 respectively, may be flat and lie at right angles to the plane of the tool body 1. The lateral edges 10, 18 are also provided flat and lie approximately parallel to one another.

The bottom 28 of the recess 8 lies approximately in the direction of movement of the tool arrow 29, and has a profiled bridge-piece 30 substantially coextensive therewith the bridge piece being symmetrically disposed with respect to the middle plane of the tool body 1 and being narrow compared with its thickness, the bridge piece 30 engaging a groove 31 in the lower edge 32 of the intermediate piece 13, such edge being parallel to the bottom 28 and the latter via, for example, semi-circularly recessed corner zones 33 merging into the lateral edges 9, 10 the profiled bridge-piece 30 extending as far as these corner zones 33. By means of the profiled bridge-piece 30, which latter is a tight fit in the intermediate piece 13 in the cross-wise direction of the tool body 1, the intermediate piece 13 is secured and accurately aligned cross-wise to the plane of the tool body 1.

As the cutting members 4 and 5, respectively, are clamped by the intermediate piece 13 by turning the clamping eccentric 14, then the zones of the tool body 1 lying on each side of the recess 8 are forced apart by the clamping pressure under elastic deformation so that the lateral edges 9, 10 take up in respect of one another, different angular positions than was previously the case. However, due to the face that the intermediate piece 13 can vary its position relative to the clamping eccentric 14 by means of the floating bearing line 20, the faces 11, 27 and 15, 16, as well as the peripheral face of the bearing journal 21 and the bearing recess 12, may lie completely flat on one another. The generally curved surface of the clamping eccentric 14 has flattened portion 34 arranged approximately tangentially to the outer periphery of the bearing journal 21 and which connects that part of the peripheral surface 17 of the eccentric 14 furthest from the axis of such eccentric 14 with that part of such surface lying closest to this axis. If by rotation of the clamping eccentric 14 the portion 34 is brought into the area 20 then the clamping eccentric 14 can be moved so that the periphery of the bearing journal 21 can contact the recesses 24 in the groove 19 so that the clamping element 6 is completely loosened and can be removed easily from the recess 8. The intermediate piece 13 forms on the breast face 16 of the cutting member 4 and 5 respectively, a cutting guide edge 35 set back in respect of the cutting zone 7 which is formed by its outer edge turned away from the inner edge 32.

In FIGS. 4 and 5 for corresponding parts like referenes to those of FIGS. 1 to 3 are used but with the index "a".

In the embodiment shown in FIGS. 4 and 5, the clamping element in addition to the intermediate piece 13a also includes a counter-bearing piece 36 at that side of the clamping eccentric 14a remote from the intermediate piece 13a, with the recess 23a and the bearing recess for the bearing journal 21a being provided in such counter bearing piece, thereby avoiding the need to provide the same in the tool body 1a. The clamping face 12a—lying opposite to the cutting member 4a may be formed directly by the corresponding lateral edge of the recess 8a which can be formed linear and profiled and on which a corresponding face of the counter bearing piece 36 is supported and completely flat. Since, with this embodiment of the clamping element 6a, a further part, as well as, possibly, a wider design of recess 8a is necessary but simpler construction of the tool body 1a results. The counter bearing piece 36 has a groove for engaging the profiled bridge piece 38 so that such piece 36 is secured cross-wise to the plane of the tool body 1a. The clamping face 12a is according to FIG. 5, is of triangular cross-section with a profile angle of 90° and engages in a corresponding groove-like counter face 37 of the counter bearing piece 36 so that this is also secured in this area cross-wise to the tool body 1a. In FIG. 5, the projections forming the bearing journals 21a project laterally beyond the lateral faces 38 of the clamping eccentric 14a, the common length of the projections being at least as great as the axial extension of the clamping eccentric 14a.

In FIGS. 6 to 9, a sawing tool is shown in which the cutting members 4a, 5b are not inserted directly on the tool body 1b but on segments 39 which in their turn are fixed to the tool body 1b and, in particular to the periphery thereof. On the annular sector-like segments 39 the cutting members 4b, 5b can be clamped with clamping element 6b in the same manner as in the embodiments according to FIGS. 1 to 5, the segments 39 being arranged in succession in the peripheral direction of the tool, and the outer edges thereof being identical with the corresponding parts of the tool body as shown in FIGS. 1 to 5. The contact faces between the successive segments 39 are arranged suitably in axial planes of the tool body 1b.

The tool body 1b has on its periphery and outwardly extending annular bridge-piece 40 arranged symmetrically with respect to the middle plane, the bridge-piece 20 engaging grooves 41 at the inner edge of the segments 39 and to which the segments are detachably fixed by the suitable means. For example, rivet 42 arranged in spaced successive disposition in the peripheral direction and passing both through the segments and through the annular bridge-piece 40 may be used. In addition there is provided outwardly of the annular bridge-piece 40 and at the junction between adjacent segments 39 a bolt 43 passing through such segments, the bolts being symmetrically positioned with respect to the two adjacent segments 39. Each segment 39 has generally only a single cutting member and is preferably of the same thickness of the tool body 1b.

As FIG. 8 shows, the lateral faces 44 of the cutting member 4b do not, in practice, project beyond the lateral faces of the segment 39 and of the tool body 1b. As FIGS. 9 show, the cutting member 5b may however project laterally on one side or both sides beyond the segment 39 on the tool body 1b. In the embodiment shown in FIGS. 5 to 9 there are provided alternatively cutting members 4b according to FIG. 8 and cutting members 5b according to FIG. 9 so that a particularly stable cutting behaviour is ensured. As FIGS. 8 and 9 furthermore show, the clamping faces 11b are groove-like and, in fact, of V-shaped cross-section having an included angle of 90°, the counter faces 37b of the cutting members 4b, 5b being correspondingly profiled so that they are secured in position cross-wise to the plane of the tool body and of the segment 39.

The clamping faces 11b may be inclined to the plane of the tool body 1b, as seen in the plane of the tool body, whereby some clamping faces 11b are provided inclined in the one direction and some clamping faces are inclined in the other direction preferably in the directions of inclination of the clamping faces alternate in the two directions so that the clamping members inserted in them project alternately at opposite sides of the tool body even when they have a width which does not exceed that of the tool body, in FIG. 7. This alternately inclination of the cutting member is shown in FIG. 7, one cutting member being shown in full line and the other in dot-and-dash lines.

In FIG. 10 the design of a profiled bridge piece 30 for the tool body 1 and for the segments 39, as well as a groove 31 in the intermediate piece 13 is shown, the profiled bridge piece 30 being of rectangular or square cross-section and the groove 31 being correspondingly shaped. In FIGS. 11 to 17 further embodiments of the profiled bridge-piece 30 and the groove 31 are shown. According to FIG. 11, the profiled bridge-piece is triangular and the groove V-shaped. According to FIG. 1 the profiled bridge-piece is not provided at the bottom of the recess but on the intermediate piece or on the counter-bearing piece, the groove being provided at the bottom of the recess. The profiled bridge-pieces according to FIGS. 13 and 14 are of approximately semi-circular cross-section, as are the grooves, FIG. 13 showing the profiled bridge-piece on the tool body and FIG. 14 on the intermediate or counter bearing piece. According to FIGS. 15 and 16 a profiled bridge-piece is trapezoidal, the inclined faces extending as far as the lateral faces of the tool body or of the intermediate or counter bearing piece and the groove is of corresponding trapezoidal shape. In the case of FIG. 15, the bridge-piece is provided on the tool body, which according to FIG. 16 the bridge-piece is on the intermediate or counter-bearing piece. In the arrangement of FIG. 17, the profiled bridge-piece is of rectangular cross-section and is provided on the intermediate piece or on the counter-bearing piece.

In essence, the bearing surfaces, such as surface 37 as seen in FIG. 5 and the surfaces shown in FIGS. 10–17, comprise opposed lateral portions by virtue of complementary geometries in which one surface is grooved, indented or concaved and the other surface is ribbed, projected or convexed, so as to be received within the first surface. Such an arrangement provides lateral stability for retaining the eccentric 14 and intermediate member 13 substantially within the planes defined by the side surfaces of the tool body or tool support 1.

The cutting member 4c according to FIGS. 18 to 20 is, in like manner to the cutting members of FIGS. 1 to 9, formed approximately rod-like whereby one end forms, for example, a cut-back face 45 which in side view as shown in FIG. 18 lies at an acute angle to the flat breast face 16c. The other end face is provided at right angles to the breast face 16c. The cut-back rear face forms together with the breastface 16c, the cutting edge 46. The rearward parts of the lateral faces 44c are inclined towards the rear 27c of the cutting member 4c at an acute angle, the faces closing the rear side thereby having an axial free angle. In addition, those parts of the lateral faces 44c adjacent the breast face 16c are outwardly divergent towards the cutting edge so that they therefore have a flank radial free angle. The rear side 27c is, for engagement with a V-shaped clamping face, of trapezoidal cross-section throughout the whole length of the cutting member.

The clamping face provided on the tool body or on the segment to receive the cutting member may be of circular cross-section, in particular approximately semi-circularly whereby then the cutting member 4d according to FIG. 21 is rounded on its rear side 27d so that the cutting member may float in the clamping face and may then be aligned extremely accurately. The intermediate piece contacts completely flat on the breast side 16b; the cutting member 4d is therefore mounted floating with regard to a pivot axis lying approximately parallel to the plane of the tool body and cross-wise to the cutting direction.

The cutting member 4e according to FIGS. 22 to 24 is formed on both ends with oblique rear face cutters 45e so that it has two cutting edges 46e. The lateral faces 44e are, however, provided with only a flank axial free angle and not with a flank radial free angle, the cutting member 4e being used as a turning cutter member in that by rotating the cutting member either cutting edge 46e can be brought into the region of the cutting zone.

Whilst in the embodiments according to FIGS. 18 to 24 the breast faces of the cutting members are formed flat the breast face 16f of the cutting member 4f according to FIG. 25 is profiled in cross-section. With the embodiment shown the breast face 16f is projecting and in fact profiled triangularly such that it is formed by two single faces lying at obtuse angle to one another and for the most part symmetrically which engage in a corresponding recessed counter face of the intermediate piece.

In the embodiment according to FIGS. 26 to 28 the cutting member 4g from its cutting face 49g to the other end face is thickened in that its breast face 16g and its rear side 27g at an acute angle opening to this end face. The lateral faces 44g have however a flank radial free angle. This cutting member 4g is particularly suitable for rapid rotation tools, that is to say tools with high speeds or rotation, as with the centrifugal forces occurring an increase of the clamping with the clamping piece is brought about.

In FIG. 29 it is indicated how simple for example, cutting members 4h designed according to FIGS. 22 to 25 can be arranged by alternate angle displaced arrangement according to FIG. 7 such that one side face 44h lies with a flank radial free angle to the tool body whilst the other lateral face projects back opposite the appropriate lateral cutting plane of the tool. The inclined position of the cutting members 4h is brought about by a suitable design of the preferably prism shaped clamping faces which are provided for contact of the cutting members.

It is, of course, to be understood that the present invention is, by no means, limited to the specific showing in the drawings, but also comprises any modifications within the scope of the appended claims.

What I claim is:

1. A saw tool for making a saw cut, the saw tool comprising: a tool support with a plurality of recesses distributed in spaced relation with one another along the periphery of the tool support, each recess being defined by a pair of clamping surfaces; a cutting blade disposed in each recess between the pair of clamping surfaces; an eccentric in each recess, the eccentric having a surface with a first radius of curvature and being rotatable about an axis normal to the radius of curvature; an intermediate member disposed in each recess between the eccentric and the cutting blade for holding the cutting blade against one of the clamping surfaces of the recess, said intermediate member being spaced from the bottom of said recess, the intermediate member having a first surface abutting the cutting blade and a second surface abutting the eccentric wherein the second surface has a radius of curvature substantially greater than the radius of curvature of the eccentric thereby establishing line contact between the second surface of the intermediate member and eccentric along a line normal to the line of the saw cut, whereby the intermediate member rocks about the line as the saw tool cuts.

2. The saw tool of claim 1 wherein the clamping surfaces converge toward one another in a direction toward the periphery of the tool support.

3. The saw tool of claim 2 wherein the surfaces on the intermediate member and eccentric which are in abutment have laterally opposed bearing portions for providing lateral stability of the eccentric, intermediate member and tool support relative to one another.

4. The saw tool of claim 3 wherein the clamping surface of the recess opposite the surface against which the cutting blade abuts includes an arcuate indentation complementing the geometry of at least a portion of the periphery of the eccentric.

5. The saw tool of claim 3 wherein the intermediate member is split into two sections having a gap therebetween, one of which sections is disposed between the clamping surface opposite the clamping surface against which the cutting blade abuts and the other of which is between the eccentric and cutting blade, wherein the gap permits the second section to rock about the line of contact.

6. The saw tool of claims 1, 2, 3, 4 or 5 wherein the saw tool is a circular saw and the tool support is a relatively thin disc having the recesses and cutting blades spaced around the entire periphery thereof.

* * * * *